United States Patent [19]
Bauerle et al.
[11] Patent Number: 4,802,902
[45] Date of Patent: Feb. 7, 1989

[54] AIR CLEANER COVER AND BASE FOR DUAL CARBURETOR ASSEMBLIES

[75] Inventors: David D. Bauerle, St. Clair Shores; Barry I. Rabotnick, Southfield, both of Mich.
[73] Assignee: Colt Industries Inc., New York, N.Y.

[21] Appl. No.: 66,354
[22] Filed: Jun. 10, 1987
[51] Int. Cl.[4] .......... B01D 46/00
[52] U.S. Cl. .......... 55/484; 55/498; 55/510; 55/DIG. 28; 123/579; 29/469
[58] Field of Search .......... 55/482, 484, 488, 498, 55/510, DIG. 28; 29/469; 123/579, 580, 198 E

[56] References Cited

U.S. PATENT DOCUMENTS 4,062,334 12/1977 Toda et al. .......... 123/579
4,104,881 8/1978 Kogure et al. .......... 123/579
4,390,354 6/1983 Witchell .......... 55/483

*Primary Examiner*—Bernard Nozick
*Attorney, Agent, or Firm*—Walter Potoroka, Sr.

[57] ABSTRACT

A universal air cleaner cover base plate assembly for mounting standard size ring shaped air filters on closely spaced dual carburetors includes a pair of circular base plates formed with eccentrically located circular openings. The openings enable the base plate to be mounted upon the air cleaner flange of the carburetor body for rotative adjustment and their eccentric relationship to their base plates enables the center to center spacing of the filter elements to be adjusted independently of the fixed center to center spacing between two adjacent carburetors. The cover is of a generally rectangular configuration dimensioned to cover the tops of both air filters.

13 Claims, 2 Drawing Sheets

AIR CLEANER COVER AND BASE FOR DUAL CARBURETOR ASSEMBLIES

BACKGROUND OF THE INVENTION

This invention relates generally to air cleaners for internal combustion engines, and more particularly to means providing adjustability of mounting a single air cleaner cover on separate air cleaner elements such as in a "2×4" carburetor installation.

As used herein, the term "carburetor" is not limited to a fuel control device technically known as a carburetor; rather, it means and includes any fuel control device such as a fuel injection throttle body, which may have a flange means and by which it is mounted to the engine intake manifold, one or more air induction flanges or bores each having a throttle valve to control the flow of air to the engine and means for mounting an air cleaner thereon. That is, the invention is adapted for use with any air induction devices requiring an air cleaner cover.

The modification of a standard internal combustion engine to achieve maximum performance for racing purposes normally involves the replacement of the original equipment intake manifold and carburetor (or fuel injection throttle body) package with specialized intake manifolds and carburetors specifically designed for various competitive usages. Where feasible, the modified engine will use two four barrel carburetors, a configuration conventionally identified as "2×4".

Specialized 2×4 intake manifolds are marketed by various manufacturers for mounting upon the more popular stock engine blocks, such as the small block Chevrolet engines. The location of the intake openings of the manifold establishes the assembled relationship of the two carburetors to each other. Due to differences in manifold design between different manufacturers, the distance between the center lines of the two carburetors may vary, and in some instances the carburetor center lines may be offset from each other relative to the longitudinal center line of the manifold.

The typical air cleaner employed with these carburetors includes an annular ring type filter mounted within a holder or filter housing on top of the carburetor so that air flows radially through the filter to the carburetor. Such ring type air filters are sealed at their top and bottom sides by the housing and must be of an inner diameter which is greater than that of a circle enclosing the four barrels of the carburetor. For maximum air flow, the outer diameter of the filter should be as large as possible, however, this diameter is limited by the center line spacing of the two carburetors.

The air filter element is conventionally mounted upon the main body of its carburetor upon an upwardly facing shoulder on the main body provided with an outwardly projecting flange which supports the air cleaner housing with its ring-like filter element centered coaxially of the carburetor center line. The top of the air filter element is sealed usually by a circular plate or cover which is detachably held in position by means of a bail mounted bolt secured to the carburetor main body. In this arrangement, the ring-like filter element is coaxial with its carburetor center line, and the maximum possible outer diameter of the filter element and its housing is dictated by the center line spacing of the two carburetors.

The present invention is especially directed to universal air cleaner mounting assembly for dual carburetor systems in which annular air filter elements of a single standardized maximum size may be mounted upon dual carburetors located at center line spacings varying within presently encountered limits. A single one piece cover is employed to cover the tops of the two air cleaners.

SUMMARY OF THE INVENTION

An air cleaner mounting assembly embodying the present invention includes a pair of like circular base plates and a single one piece cover of generally rectangular configuration. Each of the circular base plates may be formed with an upwardly projecting flange extending around its outer periphery dimensioned to engage the outer periphery of an annular ring-like air filter element of standardized dimensions to locate the filter element on the upper surface of the base plate. The base plate is formed with an eccentrically located circular opening dimensioned to receive, with a sliding fit, the air cleaner flange on the main carburetor body. The minimum distance between an edge of the eccentrically located opening and the outer periphery of the base plate is at least equal to or slightly greater than the radial thickness of the standard annular air cleaner element. By adjusting the rotative position of the base plates upon their respective carburetor main bodies, the eccentric location of the main body receiving opening in each base plate allows an adjustment of the radial distance of the base plate periphery measured along a line connecting the center lines of the two carburetors over a range determined by the eccentricity of the opening to the base plate periphery. This enables air filter elements of a maximum outer diameter usable on carburetors of a maximum center line spacing on carburetors of smaller center line spacings—which may be less than the outer diameter of the filter—so that a single standardized dimensioned air cleaner is usable with assemblies whose center line spacings may vary over a substantial range. It also enables filters mounted upon carburetors whose center lines may be respectively offset from the longitudinal center line of the intake filter with the filter center lines lying along a line parallel to the longitudinal center line of the intake manifold.

Other objects and features of the invention will become apparent by reference to the following specification and to the drawings.

IN THE DRAWINGS

Figure 8:
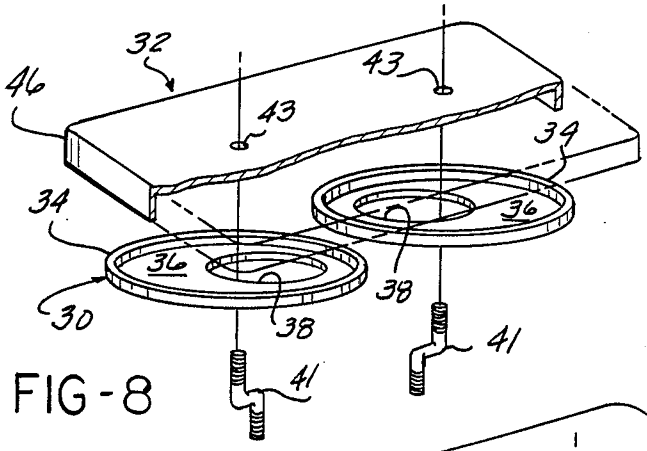
Figure 3:
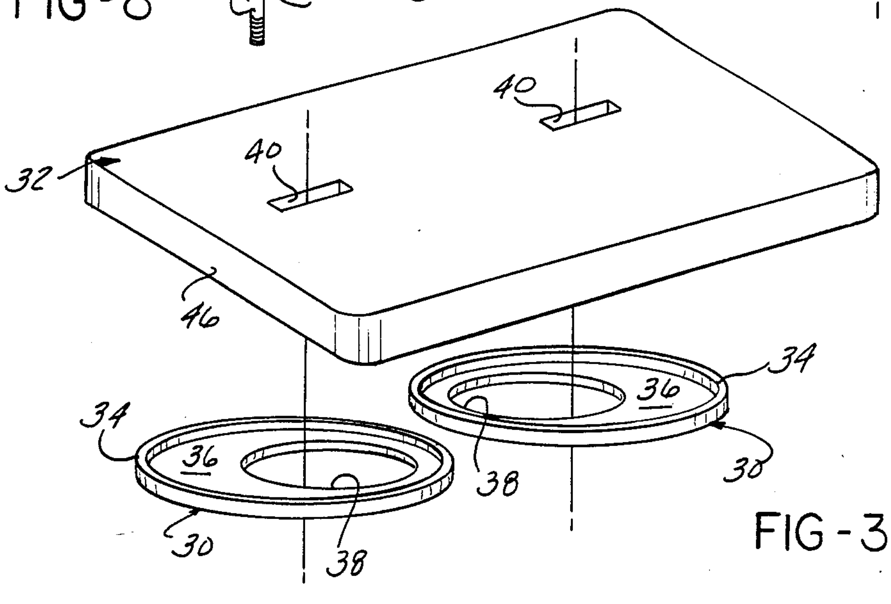
FIG. 3 is an exploded perspective view of a cover and base plate assembly embodying the present invention.
Figure 5:
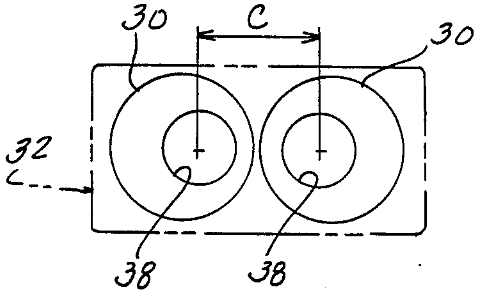
FIG. 5 is a schematic top plan view showing the base plates of the present invention mounted upon a pair of carburetors having a minimum center line spacing.
Figure 6:
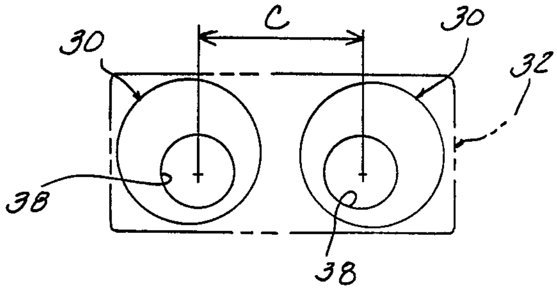
Figure 7:
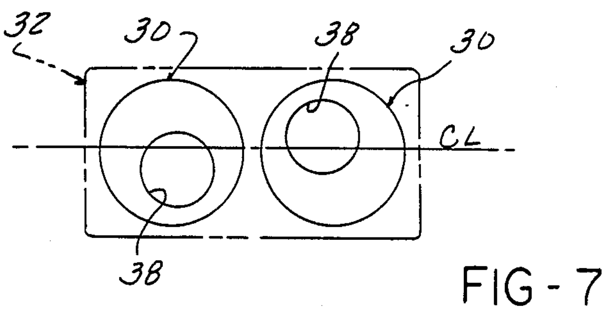

FIG. 6 is a schematic view similar to FIG. 5 showing the base plates of the present invention mounted upon a dual carburetor assembly having a center line spacing somewhat greater than that of FIG. 5; and FIG. 7 is a schematic view, similar to FIG. 5, showing base plates of the present invention mounted upon a dual carburetor assembly in which the carburetor center lines are offset with respect to the longitudinal center line of their intake manifold; and FIG. 8 is an exploded perspective view similar to FIG. 3 illustrating an offset mounting stud arrangement for the cover.

Figure 1:
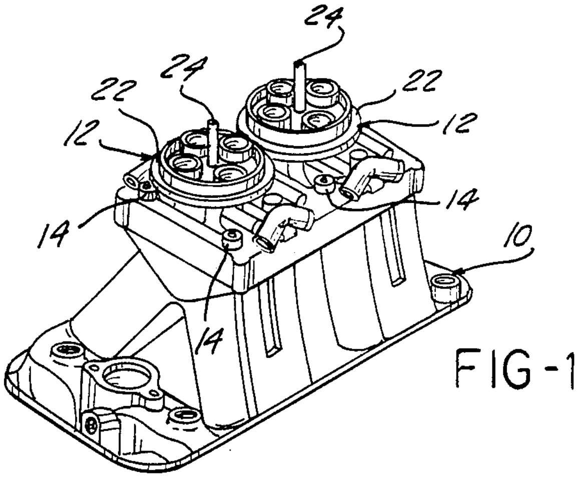
FIG. 1 is a somewhat simplified perspective view of a 2×4 intake manifold and carburetor assembly.

Referring first to FIG. 1, there is shown a somewhat simplified perspective view of a typical high performance 2×4 carburetor-intake manifold assembly which includes an intake manifold designated generally 10 and a pair of like carburetors designated generally 12. The manifold 10 is designed to be bolted to the engine block of a specific engine and is drilled and tapped at its top to receive mounting bolts such as 14 which fixedly bolt the two carburetors 12 to the top of the manifold. The spacing between the two carburetors 12 is thus determined by the configuration of the intake manifold. High performance manifolds are of very sophisticated design and the spacing between the two carburetors 12, normally measured in terms of center line to center line spacing, may vary depending upon the specific engine involved and the specific manifold design. In general, the center line spacing between the two carburetors provided by present day commercially available 2×4 intake manifolds will range from a minimum of 7.25" to a maximum of 9.375".

While the designed center line spacing between the two carburetors is sufficient to provide the necessary clearance between the two carburetors and their associated operating linkages, etc., problems are frequently encountered in providing adequate clearance between air cleaner assemblies mounted at the top of the respective main carburetor bodies. Frequently, where the carburetor center line spacing is near the low end of the range, standard sized air filter elements cannot be used because of inadequate spacing.

Figure 2:
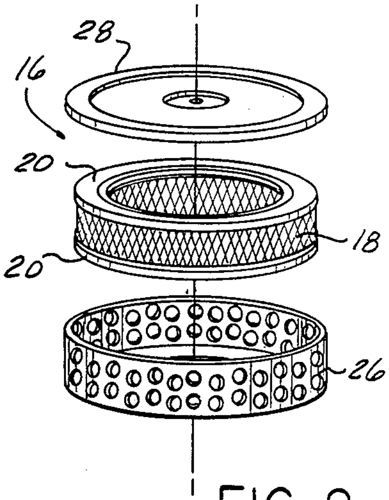
FIG. 2 is a perspective view of a typical prior art air cleaner or filter element and housing employed in connection with the present invention.

The replaceable air filter elements employed with such carburetors may take the form of a replaceable ring-like annular filter 16 (FIG. 2) having a ring-like member of filter material 18 closed at its top and bottom as by flanged annular plates 20. The upper portion of the body of each carburetor 12 is formed with an annular air cleaner flange 22 projecting outwardly from the carburetor body slightly below its top to form a seat which would sealingly support a housing 26 having a central opening in its bottom dimensioned to seat upon flange 22. The housing may be constructed with an upwardly projecting perforate sidewall dimensioned to receive and retain the replaceable filter element 16 and a detachable cover 28 closes the top of the holder. The housing 26 and cover 28 are held in assembled relationship with the carburetor by means of bolts 24 (FIG. 1) coupled by a bail to the associated carburetor body.

This arrangement found the filters 16 and their enclosing housings mounted in concentric coaxial relationship to the vertical carburetor center line and the standard 9" diameter filter elements thus were unusable in systems where the center line spacing was less than 9.375". This center line spacing problem was overcome in some instances by using specially designed oval shaped filters and covers or in some instances by using specially designed ring-shaped filters of smaller diameters. The specially designed filter configurations in turn required matching housings. Because each of these specially designed parts was, in effect, custom designed for use only in a limited number of applications, they were frequently available only on a special order basis.

The present invention is especially designed to enable the usage of larger filter elements such as standard 9" ring type filter elements, in dual carburetor systems in which the center line spacing between the carburetors may be substantially less than 9".

In accordance with the present invention, an air cleaner base plate-cover package includes a pair of circular base plates 30, best shown in FIG. 3, and a single unitary cover of generally rectangular configuration designated generally 32. Each base plate 30 is of circular configuration and formed with an upwardly projecting filter retaining flange or lip 34 which extends around the outer periphery of the circular base 36.

A circular opening 38 is formed in each base plate and is eccentrically located with respect to the center of the circular plate 36. The opening 38 is adapted to slidably fit onto the top of the body of carburetor 12 so that the base plate 30 can be seated upon the air cleaner flange 22 while the plate may be rotatively adjusted relative to the carburetor body. The flange 34 will receive and locate a standard 9" air filter element 16 upon base plate 30.

Figure 4:
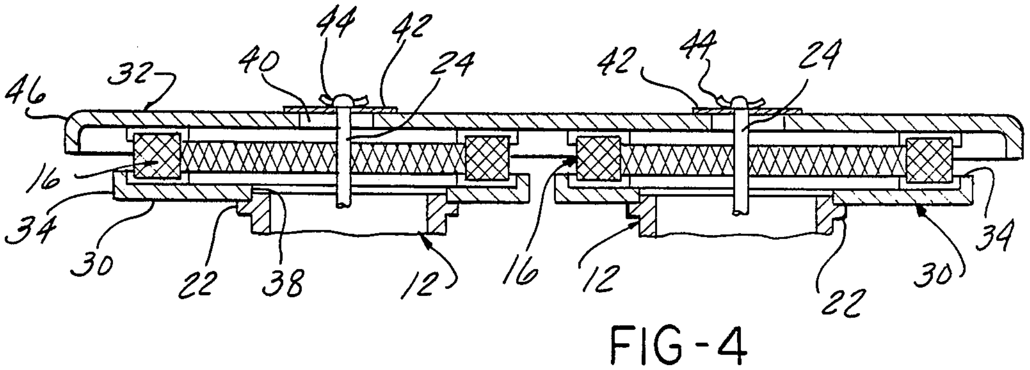
FIG. 4 is a detailed cross-sectional view of an air cleaner assembly embodying the present invention mounted upon dual carburetors.

Plates 30, filter element 16 and cover 32 are assembled upon the dual carburetors 12 as best seen in the cross-sectional view of FIG. 4, with the retaining bolts 24 of the respective carburetors projecting upwardly through slots 40 in cover 32 and through a bore in a sealing plate 42 dimensioned to seal the top of slots 40. As can best be seen in FIG. 8, the slots 40 may be eliminated by the use of an offset mounting stud 41 which has its lower end threaded and adapted to engage the carburetor air cleaner stud hole. The upper offset portion of the mounting stud 41 is designed to be equal to the offset of the air cleaner eccentric base thereby allowing the use of a single round upper mounting hole 43 with a variety of carburetor spacings. The parts are clamped in the assembled position shown in FIG. 4 in any suitable manner, such as by wing nuts 44.

The eccentric location of openings 38 in base plates 30 enable the base plates to be rotatively adjusted upon their respective carburetor bodies to provide clearance between the two filter elements 16 when the center to center spacing indicated at C in FIGS. 5 and 6 is less than the outer diameter of filter element 16. In cases where the spacing C between the carburetor center lines is a minimum, the two base plates 30 are rotatively oriented as shown in FIG. 5 with the high points of eccentricity of the respective plates being 180° offset from each other. FIGS. 6 and 7 show respectively a center line spacing greater than that of FIG. 5 and a mounting arrangement where the center lines of the carburetor are offset from the longitudinal center line CL (FIG. 7) of the intake manifold. When the offset mounting stud 41 is used, the stud is rotated to the desired location with the lower end of the stud at the carburetor center line while the upper end of the stud is at the center line of the base OD.

Opening 38 is so located that the minimum distance between the edge of opening 38 and the radially interior surface of flange 34 is at least equal to or slightly greater than the radial thickness of the replaceable filter element 16 so that the element does not block any portion of opening 38.

Cover 32 is preferably formed with an integral downwardly projecting peripheral flange 46. The dimensions of the generally rectangular cover 32 are such that its width exceeds the outer diameter of a filter element 16 and that its length is such that it can overlie two filter elements regardless of the rotative orientation of base plates 30 upon their respective carburetors. It is believed apparent that the base plate 30- cover 32 package described above provides a universal mounting arrangement for mounting standard sized ring shaped filters 16 on dual carburetor assemblies whose carburetor center line spacing may vary within reasonable limits.

While exemplary embodiments of the invention have been described in detail, it will be apparent to those skilled in the art the disclosed embodiments may be modified. Therefore, the foregoing description is to be considered exemplary rather than limiting, and the true scope of the invention is that defined in the following claims.

We claim:

1. A universal method for mounting a pair of annular air cleaners of an outer diameter A upon any of a variety of dual throttle body engine fuel system installations wherein each of said throttle bodies has an annular air cleaner flange intake concentric with a vertical center line and wherein said center lines of said two air cleaner flanges may be spaced from each other by a distance less than A and may be offset with respect to the longitudinal axis of the installation, said method comprising the steps of:

1. supporting said air cleaners upon the throttle body in respective eccentric relationship to the center line of the associated air cleaner flange such that a line connecting the centers of said annular air cleaners extends parallel to said longitudinal axis and said centers are spaced from each other by a distance greater than A,
2. locating a unitary generally rectangular cover of a width greater than A and a length greater than 2A in overlying relationship with both of said air cleaners with the longitudinal sides of said cover extending parallel to said longitudinal axis, and
3. clamping said cover and said air cleaners to said throttle bodies.

2. The invention defined in claim 1 wherein said center lines of said intake openings are located on said longitudinal axis and spaced from each other by a distance less than A, and the step of clamping said cover and said air cleaners to said throttle bodies comprises the steps of coupling a threaded bolt to each of said throttle bodies to project upwardly along the intake center line through the associated air cleaner and an elongate aperture through said cover, and threading a nut upon each of said bolts above said cover.

3. The invention defined in claim 1 wherein said center lines of said openings are symmetrically offset on opposite sides of said longitudinal axis, and the step of clamping said cover and said air cleaners to said throttle bodies comprises the steps of coupling the lower end of a mounting stud having a threaded upper end in parallel offset relationship to said lower end to each of said throttle bodies with said lower end of each stud extending coaxially of said intake center line, with each stud extending upwardly through the associated air cleaner and the upper end of each of said studs projecting upwardly through an aperture of said cover, and threading a nut upon said projecting upper end of each stud.

4. In combination with a dual throttle body assembly including a pair of throttle bodies each having a circular air cleaner flange and a pair of annular air filter elements of an inner diameter greater than the diameter of said flange, an air cleaner cover and base plate assembly for mounting said filters in operative relationship upon said throttle bodies, said cover and base plate assembly comprising a pair of circular base plates each operable to support one of said air filter elements thereon, each of said plates having an eccentrically located circular opening therethrough adapted to receive said air cleaner flange of one of said throttle bodies to support said base plate thereon and to accommodate rotative adjustment of said plate relative to said one of said bodies, and a single cover means for clamping said pair of said filter elements respectively upon said pair of base plates located respectively on said flanges of said pair of throttle bodies.

5. The assembly recited in claim 4, wherein said cover means is of unitary construction.

6. The invention defined in claim 4 further comprising means on each of said base plates for locating an air filter element in concentric relationship with said base plate.

7. The invention defined in claim 4 wherein said cover means is of a generally rectangular configuration of a width and length sufficient to cover both of said pair of filter elements.

8. The invention defined in claim 4 wherein said cover means includes a pair of longitudinally spaced elongated mounting slots which extend through said cover means; and a retaining bolt which extends upwardly from each of said pair of throttle bodies and through one of said spaced slots.

9. The invention defined in claim 4 wherein said cover means has a pair of spaced circular bores, said assembly further comprising offset mounting studs, each having a lower end attached to one of said throttle bodies and an upper end which extends through one of said pair of spaced bores in said cover means, and fastening means adapted to engage each of said stud upper ends for fastening said cover means to said throttle bodies.

10. For use in combination with a dual throttle body installation including a pair of throttle bodies each having a circular air cleaner flange and a pair of annular air filter elements, one for each of said throttle bodies, of an inner diameter greater than the diameter of said flange; an assembly of a single air cleaner cover and a pair of base plates for mounting the filters in operative relationship upon the throttle bodies, each of said plates having an eccentrically located circular opening therethrough adapted to receive the air cleaner flange of one of the throttle bodies to support said base plate thereon and to accommodate rotative adjustment of one of said plates relative to one of the throttle bodies, said single cover means clamping one of the pair of filter elements respectively upon one of said pair of base plates located respectively on the flange of one of the throttle bodies, said single cover means having a pair of spaced mounting holes, said assembly further comprising a pair of offset mounting studs each having a lower end attached to one of the throttle bodies and an upper end which extends through one of said cover mounting holes; and fastening means adapted to engage each of said stud upper ends for fastening said cover means to both of the bodies, each of said mounting studs having an intermediate portion that offsets said lower end from said upper end allowing relative annular adjustment of said plates on the bodies.

11. The combination of an internal combustion engine, an intake manifold mounted on said engine, a pair of fuel system throttle bodies mounted on said manifold, each of said throttle bodies having an annular air cleaner flange thereon, and an air cleaner assembly mounted on said throttle bodies, said assembly comprising a pair of annular base plates, a pair of annular air filter elements and a single air cleaner cover for covering both of said filter elements, each of said base plates being formed with an upwardly projecting annular flange dimensioned to engage the outer periphery of one of said annular air filter elements to locate said one filter element on the upper surface of said base plate, each of said base plates being further formed with an annular opening eccentrically located with respect to said upwardly projecting annular flange and dimensioned to receive said annular air cleaner flange of one of said throttle bodies, the minimum distance between an edge of said eccentrically located opening and said upwardly projecting annular flange of each of said base plates being at least equal to or slightly greater than the radial thickness of one of said annular air cleaner elements, said air cleaner assembly enabling adjustment of the rotative position of each of said base plates upon its respective one of said throttle bodies, said eccentric opening in each of said base plates allowing adjustment of the radial distance of the base plate upwardly projecting flange measured along a line connecting the center lines of said throttle bodies over a range determined by the eccentricity of said openings to said base plate upwardly projecting flange, whereby standard air cleaner elements and said single air cleaner cover are usable on engine configurations having different throttle body center line spacings and whereby such filter elements can be mounted upon throttle bodies whose center lines are respectively offset from the longitudinal center line or said intake manifold.

12. The invention recited in claim 10, wherein said cover means is of unitary construction.

13. The invention recited in claim 10 further comprising means on each of said base plates for locating an air filter element in concentric relationship with said base plate.

* * * * *